Aug. 10, 1965     R. E. FORREST     3,199,563
WINDSHIELD WIPER PROTECTOR
Filed Oct. 9, 1963

INVENTOR.
Robert E. Forrest
BY
Jack E. Phillips

3,199,563
WINDSHIELD WIPER PROTECTOR
Robert E. Forrest, Tulsa, Okla.
Filed Oct. 9, 1963, Ser. No. 315,034
1 Claim. (Cl. 150—52)

This invention relates to a protective device for windshield wipers. In one aspect the invention relates to a flexible means for prevention of deterioration of windshield wiping blades by protecting same from the harmful action of sun rays. In another aspect this invention relates to a means for prolonging blade life by protecting same from the harmful elements when use of same is not required.

While windshield wiper blades such as used on airplanes, automobiles and the like are subjected to some wear during atmoshperic conditions which normally require use of same, a greater contribution to the actual deterioration of the wiper blades so as to require replacement of the blade is the continuous exposure of the blades to the damaging effects of sun rays and severe weather conditions such as freezing rain and snow. Thus a means which would serve to protect the blade and thus extend its useful life while in addition allowing same to be made readily available when required for service in inclement weather would be a highly desirable and functional device in the art.

Accordingly, it is an object of this invention to provide a novel means for preventing deterioration of windshield wiper blades. Another object of this invention is to provide an enclosure for windshield wiper blades which serve to protect the blade when not in use while at the same time being instantly removable to allow the wiper blades to be available for use when required.

Other aspects, objects and the several advantages of this invention will be apparent from the specification, the drawing and the appended claim.

Figure 1:
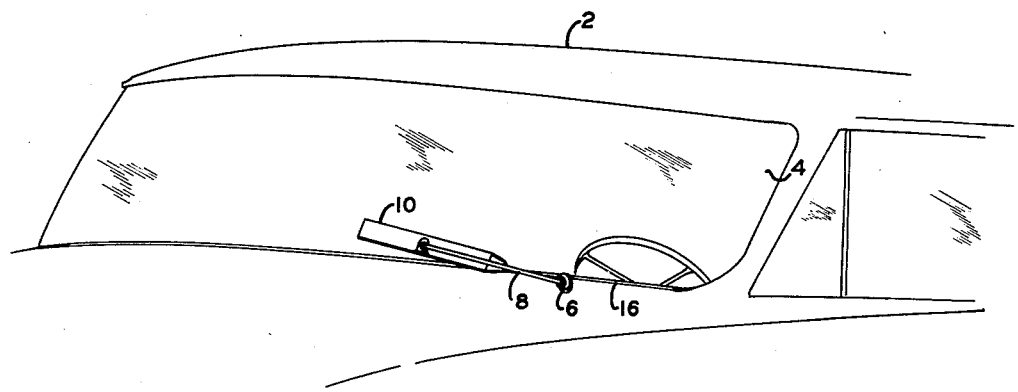
FIGURE 1 is a broken perspective view showing a vehicle equipped with the windshield wiper attachment of the present invention.
Figure 3:
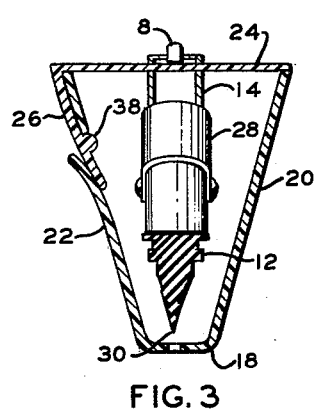
FIGURE 3 is a transverse cross-sectional view of the wiper protective means of FIGURE 1 along a plane passing through nub 38.

Referring now to the drawings, as shown in FIGURES 1 and 3, numeral 2 designates a vehicle having a windshield 4 and a windshield wiper assembly. The wiper assembly comprises an arm 8 which has its lower end 6 pivotally mounted upon the vehicle beneath the windshield and which carries at its free upper end a wiper blade cover 10. The elongated wiper blade 12 as shown in FIGURE 3 is carried by an elongated connector 14 which in turn is joined intermediate its free ends to the free end of the wiper arm 8. Thus when cover 10 is removed, the power-drive wiper oscillates from side to side, the wiper blade, in normal operation sweeps over the surface of the windshield to wipe water, ice and snow therefrom. When not in use the wipers normally rest at a point below the windshield 4 or along the bottom edge 16 of same.

The wiper attachment or cover 10 comprises an elongated cover or sleeve formed of any opaque water resistant flexible material such as polyethylene, polypropylene, celluloid and the like.

The wiper attachment 10 is generally slightly longer than the wiper blade which is enclosed thereby so as to form a container inside of which the blades rest. As shown more clearly in FIGURES 2 and 3 the wiper attachment 10 is of generally V-shaped section having an area 18 which serves as a rest for the wiper blade 12. The cover is formed by walls 20 and 22 in association with bottom area 18 and top 24. Top 24 is connected to the wall 20 along the edge 21. Strip 26 comprises extension members 26a and 26b of top 24 and serves to latch down top 24 when the wiper blade assembly 28 has been inserted therein. While the illustrative figure discloses the bottom of the wiper attachment 10 to have an area 18 which serves as a rest for the wiper blade, alternatively side members 20 and 22 can be so associated as to form a V-like crevice into which the extreme wiping edge 30 of the blade rests.

Figure 2:
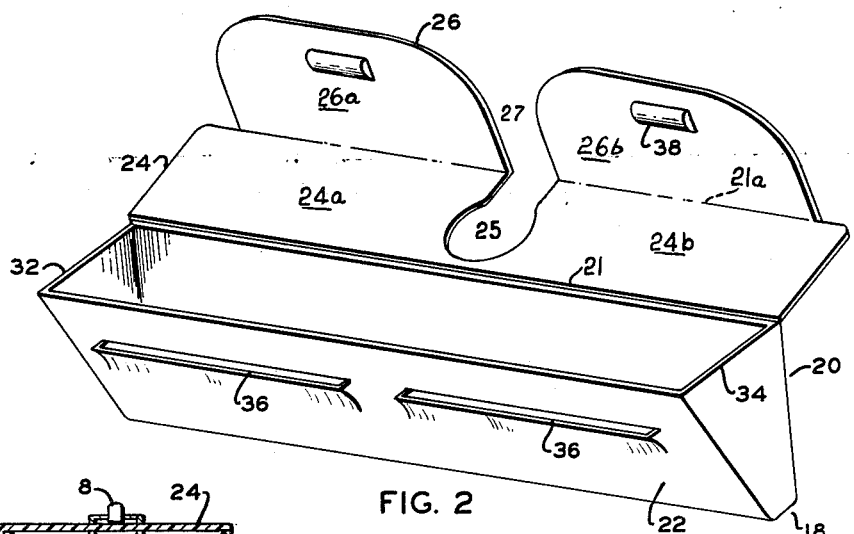
FIGURE 2 is a perspective view of the protective means prior to closing same.

As shown in FIGURE 2, the various strips which serve to form walls 20 and 22, bottom zone 18, top 24 and closure means 26 are formed integrally. It is to be understood that the various strips can be formed separately. However, when the cover is to be formed of a plastic material such as polyethylene, it is more convenient to form the entire device as a single unit as illustrated. At each end of the walls 20 and 22 there are provided sections 32 and 34, respectively, which serve to complete the enclosure of the blade 12. Strips 24 and 26 are provided with a transverse slot, 25, 27, so as to form spaced-apart sections 24a, 24b and 26a and 26b. When the sections 26a and 26b extending from top 24 along edge 21a, are inserted into the elongated slots 36, the illustrated cover of FIGURE 2 completely encloses the wiper blade assembly. While the top 24 is illustrated to be fastened down by insertion of sections 26a and 26b having locking or securing nubs 38 on each into slots 36 as shown in FIGURE 3, it is within the scope of this invention to provide snaps or other securing means to effect the securing of the extension members 26a and 26b in position. The use of slots 36 is a preferred form of this invention since there is avoided the necessity of attaching other materials such as metal snaps to the cover device and allows the cover to be more easily produced in a form ready for use on the vehicle.

To mount cover 10, the wiper assembly 6 is lifted away from the windshield 4 and the cover attachment is slipped onto the blade 12. Top member 24 and extension members 26a and 26b are folded over and secured as shown in FIGURE 3 by insertion of the extension into slots 36 which are held in by securing nubs 38. When the blade 12 is to be operated, the extension members 26a and 26b are removed from the securing slots 36 and the entire cover withdrawn from over the blade.

Through utilization of the cover means as herein described the useful life of wiper blades is greatly extended by protecting same from those causes which would otherwise serve to deteriorate or ultimately destroy the usefulness of the blade.

Reasonable variation and modification are possible within the scope of the foregoing disclosure, the drawing, and the appended claim to the invention.

I claim:

A windshield wiper attachment comprising an elongated front wall and an elongated back wall joined together at the lower edges thereof to form a generally V-shaped cross section, first and second end walls attached to respective first and second ends of said front wall and said back wall to form a container, a cover member having a first edge attached to the upper edge of said back wall, said cover member having first and second spaced apart extension members attached to a second edge thereof opposite said first edge, said cover member having an opening at a point intermediate the ends thereof and extending to said second edge between said first and second spaced apart extension members and adapted to allow connection of the wiper blade to a means for operating same, said front wall having first and second spaced elongated slots substantially parallel to the upper edge thereof and adapted to receive said first and second spaced apart extension members, respectively, and first and second securing means positioned on the sides of said first and second spaced apart extension members, respectively, and adapted to secure the respective extension member in the corresponding elongated slot.

References Cited by the Examiner

UNITED STATES PATENTS

| | | | |
|---|---|---|---|
| 1,476,822 | 12/23 | Kronenberger | 229—45 |
| 1,931,293 | 10/33 | Morck | 229—22 XR |
| 1,963,378 | 6/34 | Petter | 229—45 |
| 2,026,626 | 1/36 | Gilfillan | 206—45.34 X |
| 2,926,375 | 3/60 | Flynn | 15—250.36 |
| 3,021,548 | 2/62 | Stoller | 15—250.36 |
| 3,105,990 | 10/63 | Harris et al. | 15—250.35 |

FOREIGN PATENTS 433,102  8/35  Great Britain.

JOSEPH R. LECLAIR, *Primary Examiner.*

FRANKLIN T. GARRETT, *Examiner.*